(12) United States Patent
Hansen

(10) Patent No.: US 7,889,054 B2
(45) Date of Patent: Feb. 15, 2011

(54) METHOD AND APPARATUS FOR CREATING SCRAMBLE SIGNALS IN RFID

(75) Inventor: Thorkild Hansen, Brighton, MA (US)

(73) Assignee: Seknion, Inc., Hopkinton, MA (US)

( * ) Notice: Subject to any disclaimer, the term of this patent is extended or adjusted under 35 U.S.C. 154(b) by 1024 days.

(21) Appl. No.: 11/473,763

(22) Filed: Jun. 23, 2006

(65) Prior Publication Data

US 2007/0016944 A1    Jan. 18, 2007

Related U.S. Application Data

(60) Provisional application No. 60/697,345, filed on Jul. 7, 2005.

(51) Int. Cl.
*H04Q 5/22* (2006.01)
*G05B 19/00* (2006.01)
*G06F 7/04* (2006.01)
*H04B 1/00* (2006.01)

(52) U.S. Cl. .................... 340/10.1; 340/10.2; 340/10.3; 340/928; 340/5.61; 340/5.72; 375/130; 375/131; 375/239; 342/189

(58) Field of Classification Search ................ 340/10.1, 340/10.2, 10.3, 10.4, 928, 5.61, 5.72; 375/130, 375/131, 139, 239; 342/189, 145
See application file for complete search history.

(56) References Cited

U.S. PATENT DOCUMENTS

| | | | |
|---|---|---|---|
| 5,128,669 A | 7/1992 | Dadds et al. | |
| 6,294,992 B1 * | 9/2001 | Addy et al. | 340/539.3 |
| 6,342,844 B1 | 1/2002 | Rozin et al. | |
| 6,608,588 B2 * | 8/2003 | Elam | 342/189 |
| 6,653,946 B1 | 11/2003 | Hassett | |
| 6,661,352 B2 | 12/2003 | Tiernay et al. | |
| 6,831,547 B2 * | 12/2004 | Watarai et al. | 340/5.61 |
| 7,224,711 B2 * | 5/2007 | Johnson et al. | 375/130 |

OTHER PUBLICATIONS

International Search Report for International Application No. PCT/US06/21779 of Feb. 26, 2007.
International Search Report issued Sep. 18, 2008 during the prosecution of International Application No. PCT/US2006/024689.
Written Opinion issued Sep. 18, 2008 during the prosecution of International Application No. PCT/US2006/024689.
Response to First Written Opinion filed Sep. 18, 2008 during the prosecution of International Application No. PCT/US2006/024689.
International Preliminary Report on Patentability issued Mar. 10, 2009, during the prosecution of International Application No. PCT/US2006/024689.

* cited by examiner

*Primary Examiner*—Brian A Zimmerman
*Assistant Examiner*—Nam V Nguyen
(74) *Attorney, Agent, or Firm*—Fulbright & Jaworski L.L.P.

(57) ABSTRACT

The disclosed inventions relate to a method and apparatus for creating scramble signals. The disclosed inventions further relate to a method and apparatus for creating scramble signals from data signals. The disclosed inventions also relate to a method and apparatus for creating minimum-energy scramble signals. The disclosed inventions further relate to a method and apparatus for exploiting sleep and wake commands to achieve efficient data and scramble signals.

14 Claims, 9 Drawing Sheets

US 7,889,054 B2

METHOD AND APPARATUS FOR CREATING SCRAMBLE SIGNALS IN RFID

CROSS-REFERENCE TO RELATED APPLICATIONS

This application claims the benefit of U.S. Provisional Application No. 60/697,345, filed on Jul. 7, 2005, which is hereby incorporated by reference in its entirety.

FIELD OF INVENTION

The invention relates to the interrogation of RFID tags. More particularly, the invention relates to a method and apparatus for creating scramble signals.

BACKGROUND OF THE INVENTION

Radio Frequency Identification ("RFID") is a generic term for technologies that use radio waves to automatically identify individual items. Objects can be identified using RFID by storing a serial number that identifies the object on a chip that is attached to an antenna. The chip and the antenna together are called an RFID tag. An RFID reader sends out electromagnetic waves that are received by the antenna on the RFID tag. Passive RFID tags draw power from this electromagnetic field to power the chip. Active tags use their own batteries to power the chip. The tag responds to the reader by transmitting a bit stream to the reader that contains information about the tag (serial number, etc.). The current state of RFID technology is described in [1] K. Finkenzeller, "RFID Handbook" (John Wiley & Sons, 2003). Background information regarding the present disclosure may be found in [2] U.S. patent application Ser. No. 11/066,048, "Method and Apparatus for Improving the Efficiency and Accuracy of RFID Systems," filed Feb. 25, 2005, which is hereby incorporated by reference in its entirety.

RFID systems operate at many different frequencies. The most common frequencies are low frequencies around 135 KHz, high frequencies around 13.56 MHz, ultra-high frequencies (UHF) around 900 MHz, and microwave frequencies around 2.45 GHz and 5.8 GHz. Global protocol standards ensure compatibility between RFID systems from different manufacturers. For example, EPCglobal, Inc. has developed a protocol for UHF systems described in [3] "EPC™ Radio-Frequency Identity Protocols Class-1 Generation-2 UHF RFID Protocol for Communications at 860 MHz-960 MHz" (EPCglobal, Inc., 31 Jan. 2005). Tags that adhere to this protocol transmit information only after receiving specific instructions and can be instructed to stay quiet with a "sleep" command, which is in effect until a "wake" command is issued. Thus, a reader interrogates only the subset of the tag population that has not received the sleep command. (The "sleep" and "wake" commands as described here can be obtained by combining commands specified in [3].)

Current RFID systems do not have well-defined interrogation zones, and tags in large regions are set off unintentionally. Reference [2] discloses RFID readers that transmit data signals that cause the tags to respond and scramble signals that do not cause the tags to respond. The data and scramble signals are transmitted with different beams that are adjusted such that the scramble signals overshadow the data signals in all but selected regions. Hence, a tag will respond only if it is located in one of the selected regions, called the interrogation zones.

BRIEF SUMMARY OF THE INVENTION

One aspect of the present invention is directed to a method for obtaining the data and scramble signals from the same RF source but from separate modulators. Another aspect of the present invention is directed to a method for obtaining the scramble signal by applying a scrambler to the data signal.

The present invention is further directed to a method for obtaining scramble signals that consist of intelligible bits. In one embodiment of the present invention, the scramble signals consist of unintelligible bits. In yet another embodiment of the present invention, the scramble signals consist of both intelligible and unintelligible bits.

The present invention is further directed to a method for obtaining scramble-signal parameters that produce minimum-energy scramble signals from an experimental procedure. In one embodiment of the present invention, scramble-signal parameters that produce minimum-energy scramble signals are obtained from simulations.

In one embodiment of the present invention, the scramble signal is obtained by inverting the high and low values of the broadcast carrier of the data signal. In another embodiment, the scramble signal is obtained by making the one-bits of the data signal unintelligible. In yet another embodiment, the scramble signal is obtained by mixing the data signal with a modulating signal. In one embodiment of the present invention, the data and scramble signals employ wake and sleep commands. In one embodiment of the present invention, the scramble signal employs sleep commands.

DETAILED DESCRIPTION

Figure 1:
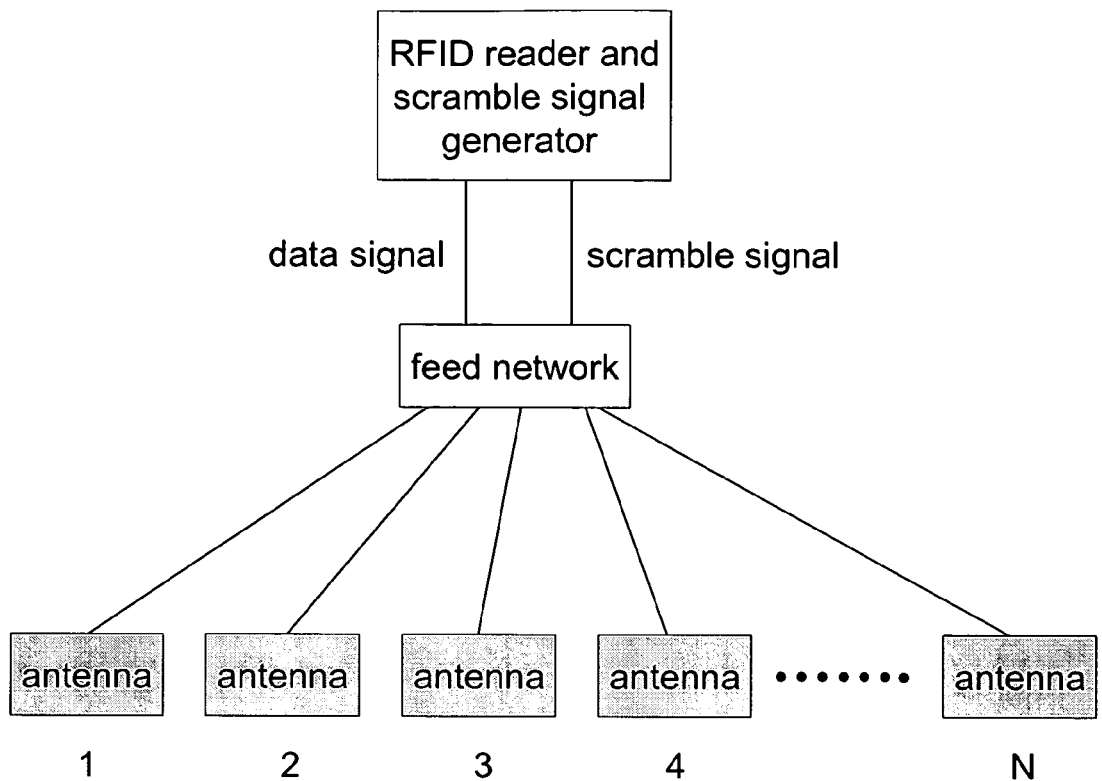
FIG. 1 illustrates a schematic of an RFID reader, scramble signal generator, and feed network for an N-element array. Each antenna element is driven through the feed network by a linear combination of two RF signals: a data signal and a scramble signal.

One aspect of the present invention is a method and apparatus by which the scramble signal can be obtained from the data signal. Also provided are methods for creating minimum-energy scramble signals. It is further explained how sleep and wake commands can be employed to achieve efficient data and scramble signals. As in [2], the data and scramble signals have the following properties:

1. Data signals cause the tags to respond. The data signal may instruct the tags to broadcast or modify stored information. The data signal may contain information about scan angles that the tags can retransmit back to the reader. Also, the data signal may employ any of the methods developed to solve the problem of a tag collision that occurs when two or more tags transmit simultaneously [1, Chapter 7].

2. Scramble signals do not cause the tags to respond. The tags neither broadcast nor modify their stored information. A pure sine wave works as a scramble signal for UHF tags. The scramble signals can be used to charge the tags and to convey a separate intelligible information stream. The scramble signal can also be referred to as a guard signal.

A reader is said to employ information steering when it transmits both data and scramble signals. Aspects of the present invention make extensive use of antenna arrays. The following references describe the theory and design of phased arrays: R. C. Hansen, "Phased Array Antennas" (John Wiley & Sons, 1998); R. J. Mailloux, "Phased Array Antenna Handbook" (Artech House, 1994); and, R. S. Elliot, "Antenna Theory and Design" (IEEE Press, 2003). With adaptive phased arrays, also known as smart antennas, the received signals and environmental parameters are fed to powerful processors that steer the beams to optimize performance. The technology for designing and constructing adaptive phased arrays with hundreds of elements that produce prescribed sum and difference patterns has reached a mature stage, as described in the following references: M. I. Skolnik, "Radar Handbook" (McGraw-Hill, 1990, 2nd edition); R. T. Compton, "Adaptive Antennas" (Prentice-Hall, 1998); and, G. V. Tsoulos, ed., "Adaptive Antennas for Wireless Communications" (IEEE Press, 2001).

Consider an array with N elements that can be fed individually with different input signals. In standard operation, one would feed array element #p with a signal of the form:

$$T_p(t)=A_p a(t-\alpha_p),$$

where a(t) is a data time signal. Generally, one could feed each array element with time functions that have different time dependences to compensate for array imperfections, end-element effects, or array elements differences. Such adjustments would be well known and straightforward to those working in this area. Therefore, for purposes of illustration, it is assumed presently that the time dependence of each input signal is the same (the amplitudes and time delays are different). The array excitation coefficients and time delays are determined by standard methods to achieve a desired radiation pattern of the array that adapts to its environment.

The controlled interrogation zone is obtained with the present invention by feeding each element with a total signal that is obtained by adding at least one scramble signal to the data signal. In the case of one scramble signal b(t), the total input signal to array element #p is:

$$T_p(t)=A_p a(t-\alpha_p)+B_p b(t-\beta_p).$$

Figure 2:
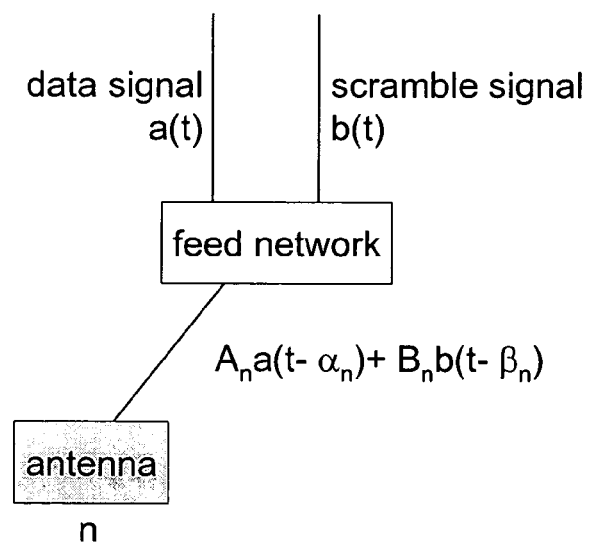
FIG. 2 illustrates a schematic of that part of the feed network that feeds the $n^{th}$ antenna of the array. The antenna is driven by a linear combination of two RF signals: a data signal a(t) and a scramble signal b(t). The beam patterns for each signal are determined by the weighting coefficients $A_n$ and $B_n$. The time delays $\alpha_n$ and $\beta_n$ steer the beams in specific directions.
Figure 3:
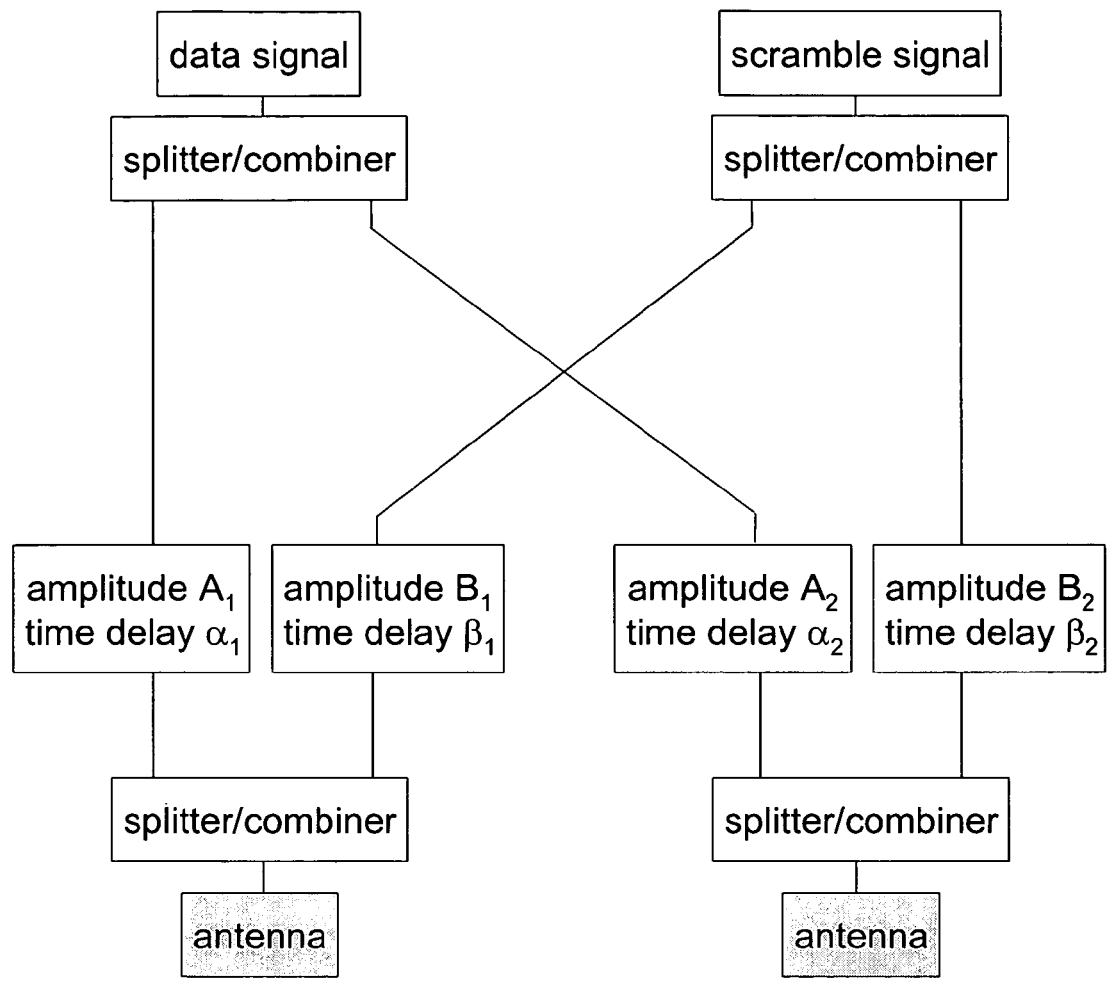
FIG. 3 illustrates a schematic of RF control electronics for a two-element array. Each antenna element is driven by a linear combination of two RF signals: a data signal and a scramble signal. The beam patterns for each signal are determined by the weighting coefficients $A_1$, $A_2$, $B_1$, and $B_2$. The time delays $\alpha_1$, $\alpha_2$, $\beta_1$, and $\beta_2$ steer the beams in specific directions.

FIG. 1 and FIG. 2 show the N-element antenna array fed through the feed network with the data and scramble signals generated by the RFID reader and scramble signal generator. FIG. 3 shows a particular implementation of the feed network for a 2-element array. It was disclosed in [2] how the parameters $A_p$, $B_p$, $\alpha_p$, and $\beta_p$ can be adjusted to create user-defined interrogation zones; in particular, it was demonstrated how to create narrow interrogation zones. Certain two-dimensional arrays (such as planar and cylindrical arrays) require two scramble signals to achieve the desired interrogation zones [2].

Hardware Configurations for Creating Scramble Signals

Figure 4:
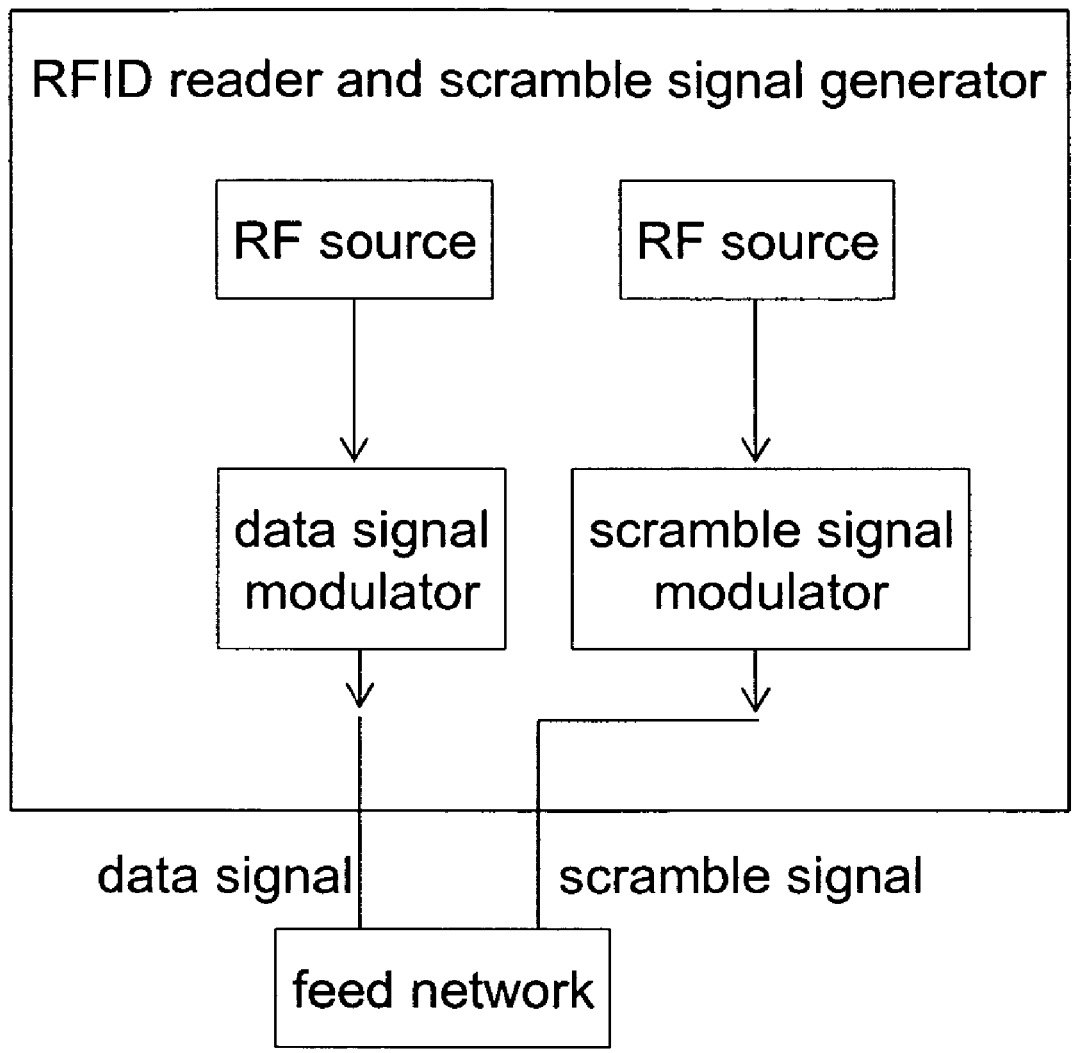
FIG. 4 illustrates a schematic of an RFID reader and scramble signal generator in which the data and scramble signals have separate RF sources and modulators.
Figure 5:
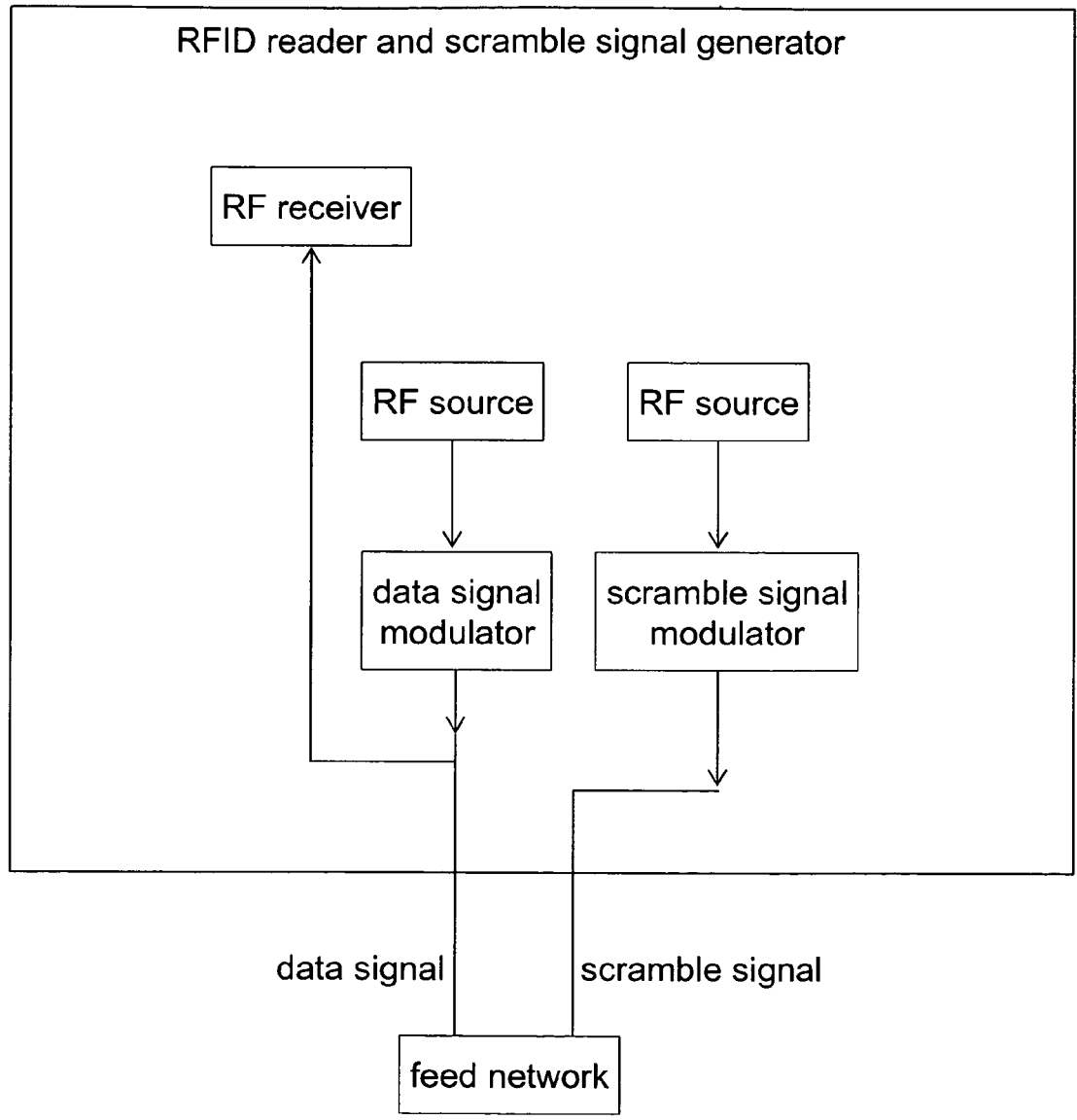
FIG. 5 illustrates a schematic of an RFID reader and scramble signal generator in which the data and scramble signals have separate RF sources and modulators. The signals transmitted by the tags are recorded with an RF receiver connected to the data-signal feed line.

The scramble signal can be generated by a separate source or obtained from the data-signal source. FIG. 4 shows an implementation where the data and scramble signals are obtained from separate RF sources and modulators. This approach allows the scramble signal to be completely independent of the data signal, and the scramble signal can carry its own information stream. Moreover, the scramble signal can be turned on all the time regardless of the data signal. In one embodiment the scramble signal is a pure sine wave, thus eliminating the need for a scramble signal modulator. The tag signals can be recorded by a separate set of antennas and feed network. Alternatively, an RF receiver that is connected to the data-signal feed line, as shown in FIG. 5, can record the tag signals.

Figure 6:
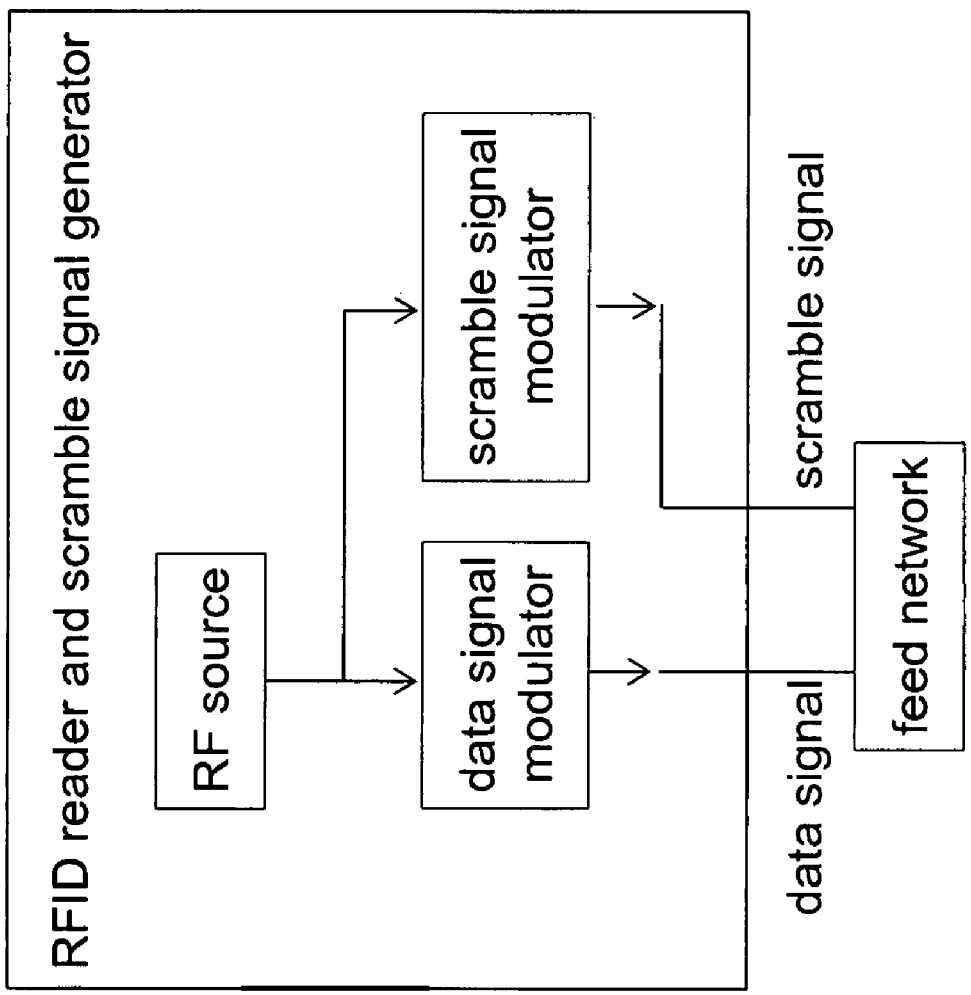
FIG. 6 illustrates a schematic of an RFID reader and scramble signal generator in which the data and scramble signals use the same RF source but different modulators.
Figure 7:
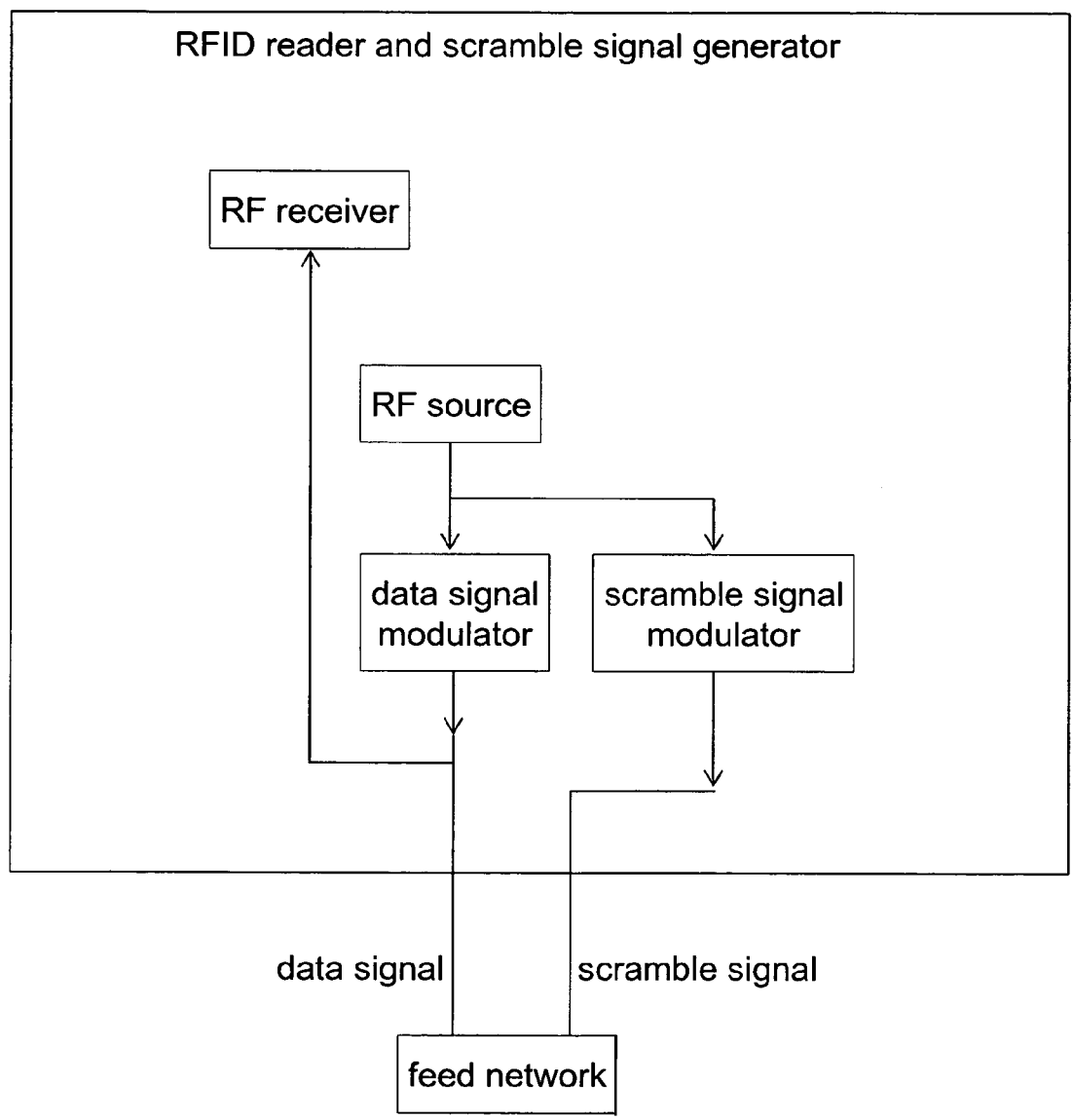
FIG. 7 illustrates a schematic of an RFID reader and scramble signal generator in which the data and scramble signals use the same RF source but different modulators. The signals transmitted by the tags are recorded with an RF receiver connected to the data-signal feed line.

FIG. 6 shows an implementation where the data and scramble signals are obtained from the same RF source but modulated by separate modulators. With this approach the data and scramble signals use the same carrier and thus at any given point in time can be made to occupy roughly the same bandwidth. This property can be highly desirable in frequency-hopping systems when each reader is assigned a unique sequence of hopping frequencies. Moreover, this approach allows the scramble signal to be independent of the data signal, and the scramble signal can carry its own information stream. The tag signals can be recorded by a separate set of antennas and feed network. Alternatively, an RF receiver that is connected to the data-signal feed line, as shown in FIG. 7, can record the tag signals.

Figure 8:
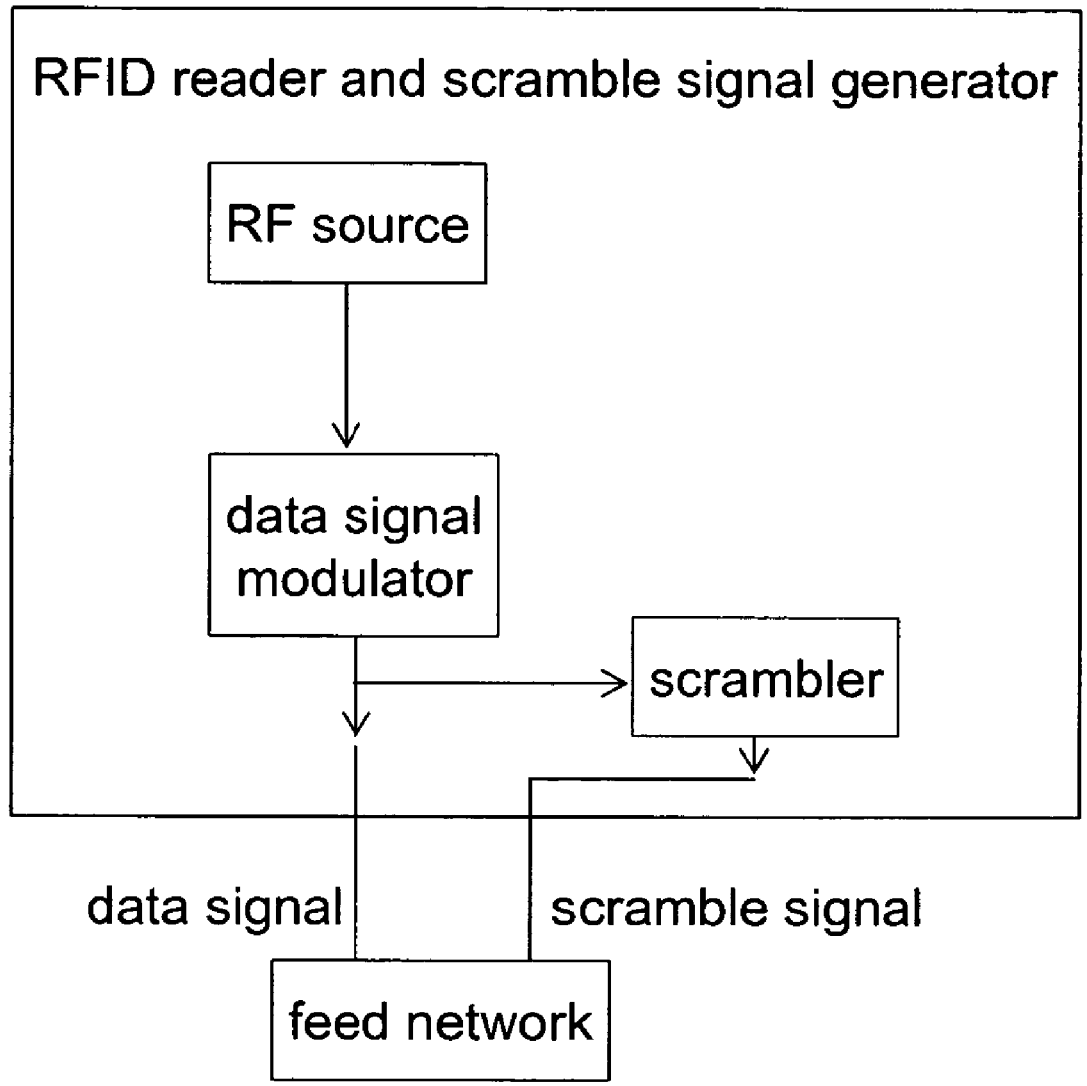
FIG. 8 illustrates a schematic of an RFID reader and scramble signal generator in which the scramble signal is obtained by applying a scrambler to the data signal.
Figure 9:
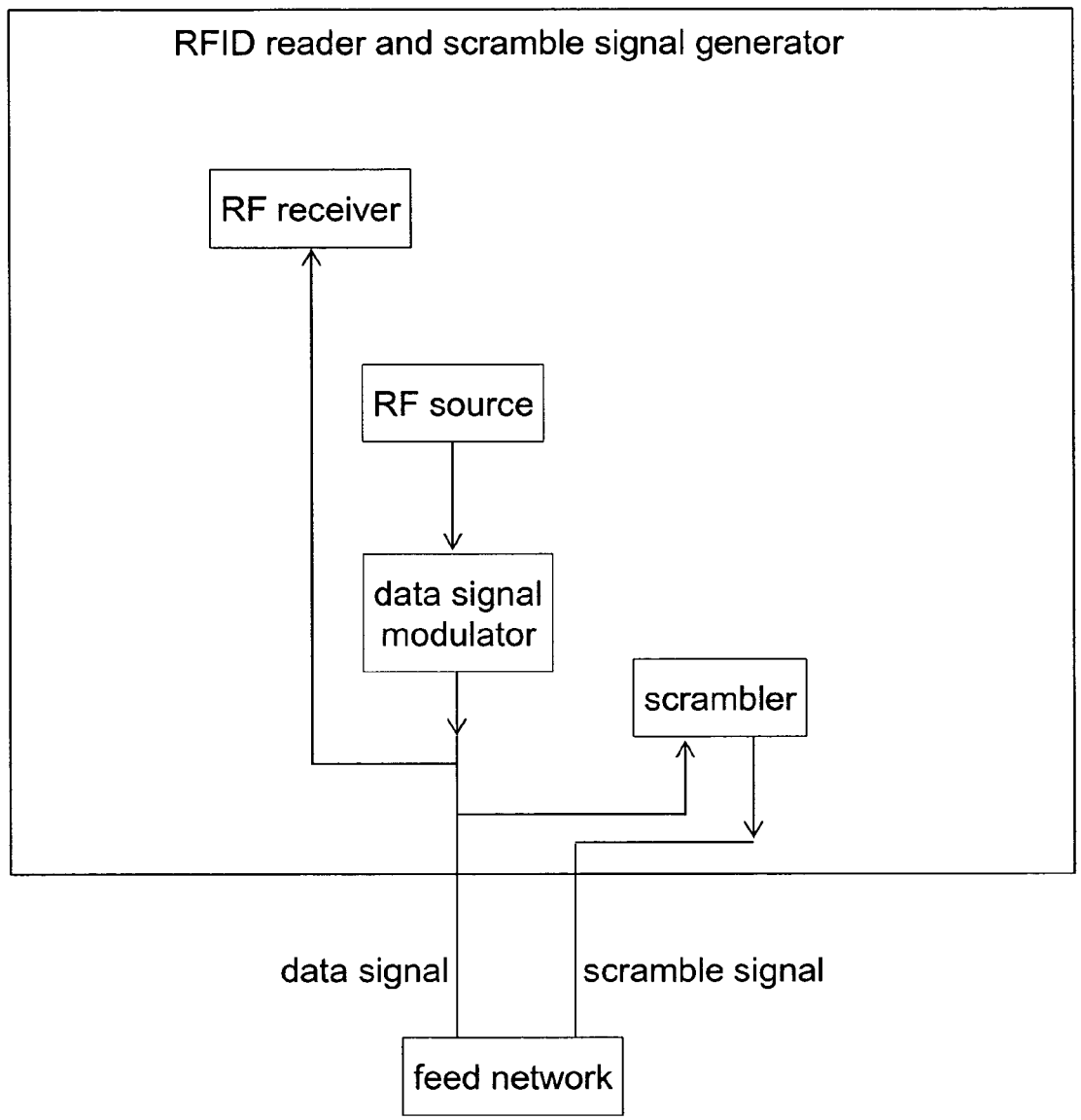
FIG. 9 illustrates a schematic of an RFID reader and scramble signal generator in which the scramble signal is obtained by applying a scrambler to the data signal. The signals transmitted by the tags are recorded with an RF receiver connected to the data-signal feed line.

FIG. 8 shows an implementation where the scramble signal is obtained by applying a scrambler to the data signal. The scrambler can simply re-modulate the data signal with an additional information stream so as to render the signal unintelligible to the tags. Various methods for creating scramble signals will be discussed below. With this approach the data and scramble signals use the same carrier and thus at any given point in time can be made to occupy roughly the same bandwidth. The tag signals can be recorded by a separate set of antennas and feed network. Alternatively, an RF receiver that is connected to the data-signal feed line, as shown in FIG. 9, can record the tag signals. A directional coupler (not shown in FIGS. 5, 7, and 9) may be used to shield the RF receiver from the strong data signal so that the RF receiver can receive the much weaker tag signals.

Methods for Selecting Scramble Signal Waveforms

Figure 10:
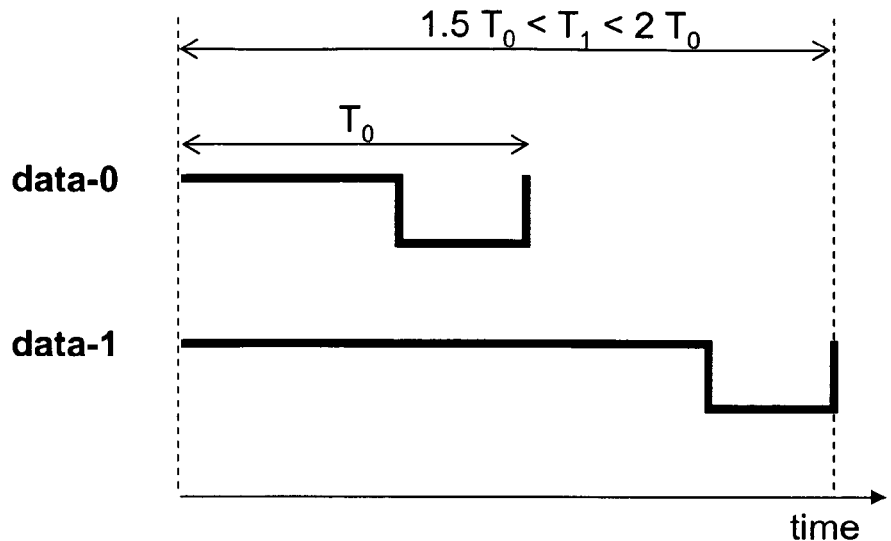
FIG. 10 illustrates a schematic of the carrier-wave amplitude for the zero-bit (data-0) and for the one-bit (data-1) broadcast using amplitude shift keying (ASK).

All signals in the frequency band of the tags, except interrogating signals that conform to the reader-tag communication protocol, are scramble signals since they do not cause the tags to respond. Efficient scramble-signal waveforms will now be presented for tags that adhere to the EPCglobal protocol [3]. This protocol is chosen for illustrative purposes only. Those working in the area of RFID data encoding will recognize that other protocols can be used with the present invention and, in particular, will from this disclosure be able to create scramble-signal waveforms for RFID systems that employ other protocols. According to [3], the zero-bit and one-bit are encoded by amplitude-shift-keying as illustrated in FIG. 10, where high values represent transmitted CW and low values represent attenuated CW.

One type of scramble signal consists of intelligible bits that do not cause a tag to respond. In this context, the phrase "intelligible bits" simply means that the scramble signal consists of a series of zeros and ones that adhere to the encoding in FIG. 10. Thus, the tags receive a series of zeros and ones that may or may not correspond to reader commands known by the tags. For example, the scramble signal can be a random sequence of zeros and ones transmitted according to FIG. 10.

Another type of scramble signal consists of only unintelligible bits. In this context, the phrase "unintelligible bits" simply means that the scramble signal does not consist of a series of zeros and ones that adhere to the encoding in FIG. 10. A pure sine wave belongs to this type of scramble signal. Yet another type of scramble signal consists of both intelligible and unintelligible bits.

Optimum scramble signals can be obtained with a scramble signal generator that has variable settings. For example, the scramble signal generator can be a modulator of a CW in which the modulation frequency, modulation depth, and modulation waveform can be varied. The variable parameters of the scramble signal generator are called the scramble-signal parameters. A minimum-energy scramble signal can be determined experimentally in the following way.

Place a tag between two antennas and broadcast an interrogation signal (data signal) with one of the antennas so that the tag is read. Then choose a set of scramble-signal parameters and broadcast a scramble signal with the other antenna with the scramble-signal amplitude adjusted so that the reader just misses the tag. Thus, the minimum scramble-signal amplitude (minimum power) is determined for this particular set of scramble-signal parameters and antenna-tag configuration. Repeat this experiment for the various scramble-signal parameters under consideration and record the minimum power for each set of scramble signal-parameters. The particular scramble-signal parameters that result in the lowest transmitted energy determine a minimum-energy scramble signal.

Numerical simulations that employ well-known mathematical models of tags can replace this experiment. Tag models and MATLAB simulations can be found in Han et al., "System Modeling and Simulation of RFID," *Proceedings of the Auto-ID Labs Research Workshop*, Zurich, Switzerland, 23-24 Sep. 2004. The optimal set of scramble-signal parameters can be obtained using non-linear optimization schemes; see, for example, P. Venkataraman, "Applied Optimization with MATLAB Programming" (John Wiley & Sons, 2001).

Scramble Signal Obtained from Data Signal

Splitting the data signal and passing part of it through a scrambler creates a scramble signal as illustrated by FIG. 8 and FIG. 9. The scrambler modifies the data signal so that it becomes a scramble signal. There are advantages to deriving the scramble signal from the data signal: (i) the scramble signal is automatically turned on only when the data signal in turned on, (ii) the spectrum of the scramble signal can easily be made to conform to the standards set forth in RFID protocols, (iii) at any given time the scramble signal can be made to occupy the same spectral bandwidth as the data signal (this is especially useful when the protocol requires frequency hopping), (iv) there is no need for a communication link between the reader and the scramble signal generator, and (v) the scramble signal generator can be built at a low cost.

As an illustrative example, consider RFID systems that conform to the protocol described in the EPCglobal protocol [3]. The zero-bit and one-bit are encoded by amplitude-shift-keying as illustrated in FIG. 10, where high values represent transmitted CW and low values represent attenuated CW. A data signal can be converted to a scramble signal in many ways. In one embodiment the scrambler inverts the high and low values of the broadcast carrier, thus making both zero-bit and one-bit unintelligible to the tags.

In another embodiment the scrambler makes all one-bits unintelligible by reducing the amplitude of the carrier wave during part of the transmission. For example, this can be achieved by not allowing a high value of the carrier wave for a time period longer than $T_0$ (see FIG. 10).

Figure 11:
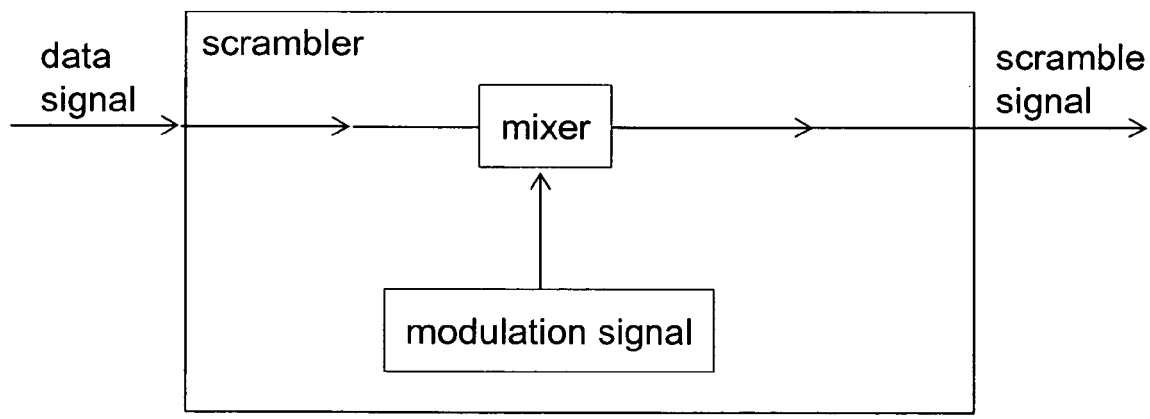
FIG. 11 illustrates a schematic of a scrambler that consists of a mixer and a modulating-signal generator.

In yet another embodiment, a mixer combines the data signal with a modulating signal, so that the resulting scramble signal is the product of the data signal and the modulating signal as illustrated in FIG. 11. The zero-bit and one-bit are both made unintelligible if the modulating signal is a sine wave or a square wave with a period on the order of $T_1$.

Data and Scramble Signals that Employ Wake and Sleep Commands

RFID systems that adhere to the EPCglobal protocol [3] can be set up so that tags stay quiet after receiving a sleep command. The sleep command is in effect until a wake command is issued. Hence, only the subset of the tag population that has not received the sleep command is interrogated. The wake and sleep commands can be used in conjunction to create data and scramble signals with desirable properties as follows.

Let the data and scramble signals be divided into two parts. The first part of the scramble signal is broadcast in the time interval $t_0 < t < t_1$ and issues a sleep command. The first part of the data signal is also broadcast in the time interval $t_0 < t < t_1$ but does not issue a sleep command (the first part of the data signal can issue a wake command if desired). Hence, the tags in the region where the scramble signal dominates are in sleep state after the first parts of the signals have been broadcast.

The second part of the data signal is broadcast in the time interval $t_1 < t < t_2$ and interrogates the tags before possibly issuing a wake command. The second part of the scramble signal can be omitted altogether since the tags in the region where the scramble signal dominates are in sleep state and will not be interrogated by the data signal. Hence, the actual interrogation of the tags can take place in a time interval $t_1 < t < t_2$ in which the scramble signal $b(t)$ has zero amplitude.

These data and scramble signals satisfy the two properties discussed above (data signals cause the tags to respond; scramble signals do not cause the tags to respond) when the entire time interval $t_0 < t < t_2$ is considered. That is, the data signal interrogates tags during the interval $t_0 < t < t_2$, whereas the scramble signal does not interrogate tags during the interval $t_0 < t < t_2$.

Conclusion

Although the present invention and its advantages have been described in detail, it should be understood that various changes, substitutions, and alterations can be made herein without departing from the invention as defined by the appended claims. Moreover, the scope of the present application is not intended to be limited to the particular embodiments described in the specification. As one of skill in the art will readily appreciate from the disclosure, other processes or systems presently existing or later to be developed may be used. Accordingly, the appended claims are intended to include within their scope other such processes and systems.

What is claimed is:

1. A method for interrogating an RFID tag using an antenna array, comprising the steps of:
   generating from an RF signal source a data signal that causes said RFID tag to respond;
   generating from said RF signal source one or more scramble signals having a bit stream that cause said RFID tag to not respond to said data signal;
   passing said data signal and said one or more scramble signals through a feed network to said antenna array; and,
   receiving a response from said RFID tag including information stored on said RFID tag when said RFID tag is located within a region where said data signal overshadows said one or more scramble signals.

2. The method of claim 1, wherein at least one of said one or more scramble signals is obtained by applying a scrambler to said data signal.

3. The method of claim 2, wherein said applying a scrambler step further comprises the step of applying a mixer.

4. The method of claim 1, wherein said data signal comprises a carrier having high values and low values and wherein said one or more scramble signals are obtained by inverting said high values and said low values of said carrier.

5. The method of claim 1, wherein said data signal and said one or more scramble signals employ sleep and wake commands.

6. The method of claim 1, wherein said one or more scramble signals employ a sleep command.

7. The method of claim 1, wherein said one or more scramble signals are minimum-energy signals.

8. A method for interrogating an RFID tag using an antenna array, comprising the steps of:
   generating from an RF signal source a data signal that causes said RFID tag to respond;
   generating from one or more RF scramble signal sources one or more modulated scrambled signals having a bit stream that cause said RFID tag to not respond to said data signal;
   passing said data signal and said one or more modulated scramble signals through a feed network to said antenna array; and,
   receiving a response from said RFID tag including information stored on said RFID tag when said RFID tag is located within a region where said data signal overshadows said one or more modulated scramble signals.

9. The method of claim 8, wherein said one or more modulated scramble signals consists of intelligible bits.

10. The method of claim 8, wherein said one or more modulated scramble signals consist of unintelligible bits.

11. The method of claim 8, wherein said one or more modulated scramble signals consists of both intelligible and unintelligible bits.

12. The method of claim 8, wherein said data signal and said one or more modulated scramble signals are minimum-energy signals.

13. The method of claim 8, wherein said data signal and said one or more modulated scramble signals employ sleep and wake commands.

14. The method of claim 8, wherein said one or more modulated scramble signals employ a sleep command.

* * * * *